(12) United States Patent
Busaba et al.

(10) Patent No.: US 7,149,767 B2
(45) Date of Patent: Dec. 12, 2006

(54) METHOD AND SYSTEM FOR DETERMINING QUOTIENT DIGITS FOR DECIMAL DIVISION IN A SUPERSCALER PROCESSOR

(75) Inventors: Fadi Y. Busaba, Poughkeepsie, NY (US); Steven R. Carlough, Poughkeepsie, NY (US); Christopher A. Krygowski, Lagrangeville, NY (US); John G. Rell, Jr., Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 10/436,322

(22) Filed: May 12, 2003

(65) Prior Publication Data

US 2004/0230634 A1 Nov. 18, 2004

(51) Int. Cl.
*G06F 7/535* (2006.01)
(52) U.S. Cl. ....................... 708/651; 708/656
(58) Field of Classification Search ............... 708/651, 708/656
See application file for complete search history.

(56) References Cited

U.S. PATENT DOCUMENTS

| | | | |
|---|---|---|---|
| 3,591,786 A | 7/1971 | Nelson | 235/164 |
| 4,384,341 A | 5/1983 | Tague et al. | 364/763 |
| 4,692,891 A | 9/1987 | Yamaoka et al. | 364/763 |
| 4,722,069 A * | 1/1988 | Ikeda | 708/656 |
| 5,023,827 A | 6/1991 | Kehl et al. | 364/744 |
| 5,132,925 A | 7/1992 | Kehl et al. | 364/764 |
| 5,587,940 A | 12/1996 | Ferguson | 364/762 |
| 5,638,314 A * | 6/1997 | Yoshida | 708/656 |
| 5,999,962 A * | 12/1999 | Makino | 708/654 |
| 6,109,777 A * | 8/2000 | Jouppi et al. | 708/656 |
| 6,847,986 B1 * | 1/2005 | Inui | 708/656 |

* cited by examiner

*Primary Examiner*—D. H. Malzahn
(74) *Attorney, Agent, or Firm*—Cantor Colburn LLP

(57) ABSTRACT

A method of decimal division in a superscalar processor comprising: obtaining a first operand and a second operand; establishing a dividend and a divisor from the first operand and the second operand; determining a quotient digit and a resulting partial remainder; based on multiple parallel/simultaneous subtractions of at least one of the divisor and a multiple of the divisor from the dividend, utilizing dataflow elements of multiple execution pipes of the superscalar processor.

11 Claims, 3 Drawing Sheets

METHOD AND SYSTEM FOR DETERMINING QUOTIENT DIGITS FOR DECIMAL DIVISION IN A SUPERSCALER PROCESSOR

BACKGROUND

Most decimal division methods are based on a straightforward iterative approach which use common fixed point dataflow elements including a decimal adder. The most significant digits of the divisor are aligned to the most significant digits of the dividend before processing begins. Significant digits may or may not include leading zeros. A quotient digit determining loop begins by subtracting the aligned divisor from the dividend. If the subtraction result is positive further subtractions of the aligned divisor are made. The quotient digit is determined by counting the number of subtraction results that are positive. When a subtraction result goes negative the divsor has been subtracted once too many times. In the restorative method the aligned divisor is added back to generate the partial remainder. The divisor is shifted one decimal digit to the right and the next quotient digit determining loop is begun.

In a non-restorative method the partial remainder is not corrected. The divisor is shifted one decimal digit to the right, the next quotient digit determining loop is begun, by adding back the aligned divisor. The quotient digit is the number of additions made until the result goes positive. This procedure is based on the fact that the last subtraction that caused the remainder to go negative is the same as subtracting 10 times the divisor after the divisor is shifted.

One method used to shorten an iterative subtraction loop (the restoring division method) is by comparing the high-order digits of the partial remainder and the divisor before each successive subtraction. When the high-order digits are not equivalent the comparison definitively determines whether the next subtraction will result in a positive or negative partial remainder. By avoiding the subtraction which will result in a negative partial remainder the loop is ended early. For the infrequent case when the high-order digits are equivalent the subtraction is made and restoration is made if needed.

Another method adds a shifter to perform digit shift processing in parallel to iterative subtraction. While another decimal division methodology predicts the range of a quotient digit. The prediction, based on the high-order digits of the dividend and divisor, determines whether to use a restoring (normal iterative subtractions) or non-restoring division method (iterative additions to a complemented dividend) to find a quotient digit. The search for the quotient digit is divided approximately in half by chosing between the two methods.

Other methods of determining a quotient digit are based on using dedicated hardware that may add more area than desired to a processor execution unit. For example, in one case, a divider circuit is used to produce one quotient digit per divider cycle. However, dedicated hardware requires additional processor area. A software method uses multiples of a divisor created and stored in a table. The high-order digits of the dividend or partial remainder are used to select a quotient digit. Hardware implementation requires table and comparator area and requires the generation of the 9 multiples.

SUMMARY OF AN EXEMPLARY EMBODIMENT

Disclosed herein in an exemplary embodiment is a method of decimal division in a superscalar processor comprising: obtaining a first operand and a second operand; establishing a dividend and a divisor from the first operand and the second operand; determining a quotient digit and a resulting partial remainder; based on multiple parallel/simultaneous subtractions of at least one of the divisor and a multiple of the divisor from the dividend, utilizing dataflow elements of multiple execution pipes of the superscalar processor.

Also disclosed herein in another exemplary embodiment is a system for decimal division in a superscalar processor comprising: a first pipeline including: a first register; a second register; a third register; an execution unit including a bit logic unit and a binary adder in operable communication with the first register, the second register, and the third register; and a first rotator in operable communication with the first register and the execution unit. The system also includes a second pipeline comprising: a fourth register; a fifth register; a sixth register; a second execution unit including another bit logic unit and another binary adder in operable communication with the fourth register, the fifth register, and the sixth register; and a rotator in operable communication with the fourth register and the execution unit. The system further includes a third pipeline comprising: a seventh register; a eighth register; a ninth register; a decimal adder in operable communication with the seventh register and the eighth register, and a rotator in operable communication with the ninth register. The system includes a general register for storage and retrieval of data; an operand buffer for obtaining from storage a first operand and a second operand; and a communication bus for communication among at least two of the first pipeline, the second pipeline, the third pipeline, the general register and the operand buffer.

Further disclosed herein in yet another exemplary embodiment is a storage medium encoded with a machine-readable computer program code, said code including instructions for causing a computer to implement the above mentioned method for decimal division in a superscalar processor.

Also disclosed herein in another exemplary embodiment is a computer data signal comprising: said computer data signal comprising code configured to cause a processor to implement the abovementioned method for decimal division in a superscalar processor.

These and other improvements are set forth in the following detailed description. For a better understanding of the invention with advantages and features, reference to the description and to the drawings.

BRIEF DESCRIPTION OF THE DRAWINGS

The present invention will now be described, by way of an example, with references to the accompanying drawings, wherein like elements are numbered alike in the several figures in which.

Figure 1:
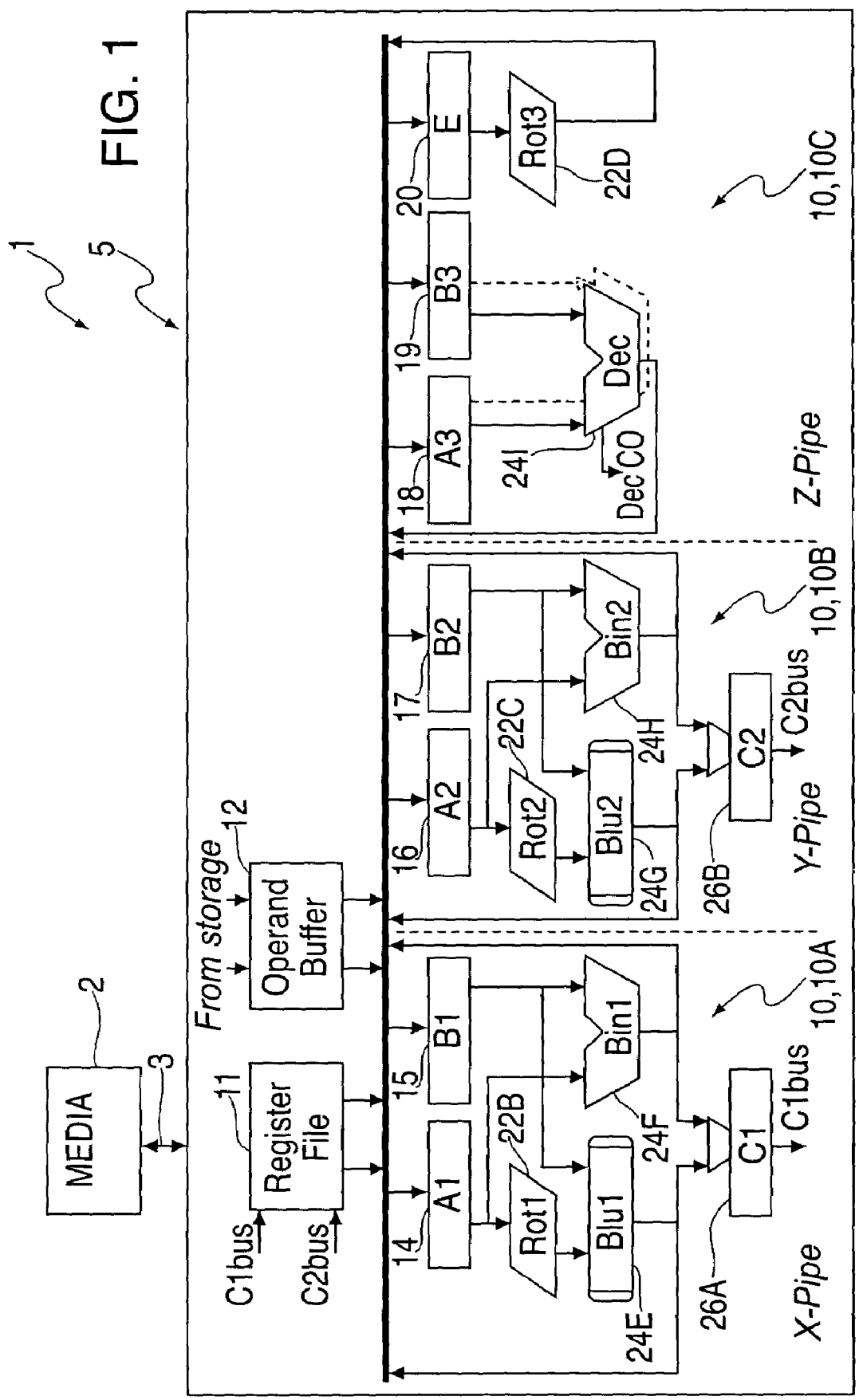
FIG. 1 depicts a simplified block diagram of a dataflow and architecture for a superscalar fixed point processor in accordance with an exemplary embodiment.

The detailed description explains the preferred embodiments of our invention, together with advantages and features, by way of example with reference to the drawing.

DETAILED DESCRIPTION OF AN EXEMPLARY EMBODIMENT

The method disclosed, determines a quotient digit and a partial remainder in decimal division by performing at least two parallel subtractions using decimal and binary adders to compare a dividend or partial remainder to multiples of an aligned divisor followed by iteratively subtracting or adding an aligned divisor to each successive result. A minimal amount of hardware beyond that typically found in a standard superscalar fixed point unit is required to implement this division method. A decimal adder is used to generate partial remainders. The carry out of the decimal adder controls subsequent adder operations. The comparison of two decimal numbers using a binary adder is described. The carry out of the binary adder controls a minuend change in the decimal adder. The minuend change effects the path taken to determine a quotient digit and the resulting partial remainder.

Decimal division operations often involve operands that are longer then the dataflow width for a given processor. For example, one decimal division instruction divides two operands represented in Binary Coded Decimal (BCD) format. The length of the first operand hereinafter denoted as the dividend may be up to 16 Bytes (e.g., 31 numeric digits plus a sign digit) and the length of the second operand hereinafter denoted as the divisor) can be up to 8 Bytes (e.g., 15 numeric digits plus a sign digit) in length. However, a processor may contain only an 8 Byte dataflow. To illustrate this methodology quotient digit (QD) determination for division, an implementation with reference to a zSeries® architecture DP instruction is given as an example.

Referring now to FIG. 1, a dataflow architecture 5 for a superscalar fixed point processor 1 including three execution pipelines 10, is depicted. The hardware in the architecture is organized into three pipes hereinafter denoted as an X-pipe 10A, a Y-pipe 10B, and a Z-pipe 10C, respectively. The architecture 5 also includes a a general purpose register file, also denoted (GPR) 11, and an operand buffer 12 that buffers read data from a data cache (not shown). The X-pipe 10A includes, but is not limited to, an operand register A1, denoted (A1) 14 and a B1 register, denoted (B1) 15. The Y-pipe 10B includes, but is not limited to, operand register A2, denoted (A2) 16 and register B2, denoted (B2) 17. The Z-pipe includes, but is not limited to an operand register A3, denoted (A3) 18, a B3 register, denoted (B3) 19, and an E register, denoted (E) 20.

The source data for each of these registers e.g., 14, 15; 16, 17; and 18, 19, 20 may come from the Register File (MGR) 11, the Operand Buffer 12, or any of the execution units 24, 24E, 24 F, 24G, 24H, or 24I. The A1 14 register of the X-pipe 10A and A2 16 register of the Y-pipe 10B feed bit rotators 22, denoted Rot1 22B and Rot2 22C respectively. Rot1 22B and Rot2 22C provide one of the source operands for the Bit Logic Units, denoted Blu1 24E and Blu2 24G respectively. Among other logical functions, the Bit Logical Units are capable of performing a bit-wise merge function between the input operands (Rot1 22B and the B1 register 15 for Blu1 24E; Rot2 22C and the B2 register 17 for Blu2 24G). The X-pipe 10A and Y-pipe 10B each also include another execution unit 24 Binary adder (Bin1 24F and Bin2 24H), A1 register 14 and B1 register 15 provide the source operands for Bin1 24F, and A2 register 16 and B2 register 17 provide the source operands for Bin2 24H. The A3 register 18 and B3 register 19 provide the source operand for,a Decimal Adder (Dec) 24I. The Z-pipe 10C also contains a nibble rotator 22 D which is fed by the E register 20. Two output registers 26 denoted C1 register 26A and C2 register 26B respectively, are used to write data to the general purpose register file 11 also denoted (MGR) and to storage (not shown). Two values may be written to and four values may be read from the MGR 11 in a single cycle. Additional logic not depicted may be included to address data handling such as detecting leading zeroes and checks for valid decimal data.

It will be appreciated that in an alternative embodiment of the X-pipe 10A, bit rotator Rot1 22B operated primarily as a bit shifter with a wrap around capability. For example, as bits are shifted, for example to the right out the least significant digit, they are wrapped around and fill bits from the left at the most significant digit.

Figure 2:
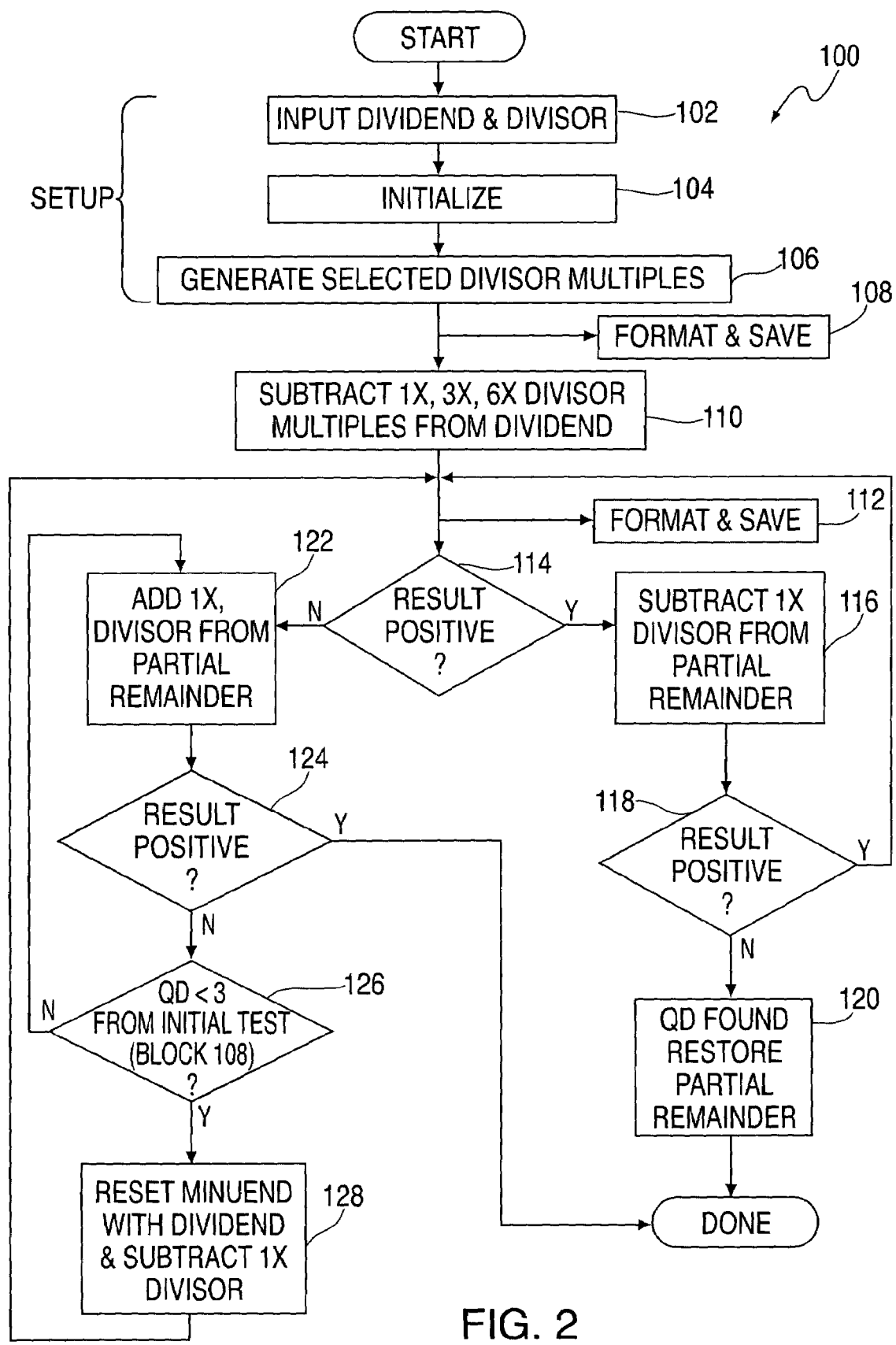
FIG. 2 depicts a simplified flow chart illustrating a division methodology in accordance with an exemplary embodiment of the invention.

Referring now to FIG. 2 as well, a simplified flow chart depicting the division methodology 100 is provided. The division methodology 100 of an exemplary embodiment is based on several premises and observations.

First, the methodology 100 utilizes the fact that subtraction in a binary adder, e.g., Bin1 24F may be used to determine if one decimal number is either less than another decimal number or greater than or equal to that number.

Second, multiple parallel subtractions, (whether in a binary adder Bin1 24F or decimal adder, Dec 24I) using different multiples of a divisor, from a dividend (or partial remainder) can be used to divide the ten possible quotient digits QDs into multiple possible quotient digit QD groups.

Third, a carry out from a decimal adder, Dec 24I, with minimal combinatorial logic, may be used in a high frequency processor to setup the decimal adder Dec 24I to add or to subtract the next sequential cycle. Advantageously, in an exemplary embodiment, a search can be made to determine a quotient digit QD and resulting partial remainder by starting from any multiple of the divisor and then working towards greater or lesser multiples. The decimal adder Dec 24I may be employed to add back an operand (such as the divisor) after subtracting "too many" multiples of an operand (such as the divisor indicated by a change in sign of the remainder.

Fourth, with a given number of binary adders, e.g., Bin1 24 F Bin2 24H and/or decimal adder(s), Dec 24I the space of possible quotient digits QDs may readily be searched or partitioned such that a balance is pursued and achieved between the number of cycles a search requires starting from different multiples of the divisor and the number of cycles that are required to setup multiples of the divisor to be used in the search.

Fifth, a carry out from a decimal adder, Dec 24I, with some combinatorial logic, may be employed in a high frequency processor to selectively in-gate operands to the registers e.g., 18, 19 and thereby to the decimal adder, Dec 24I. It should be noted that it may be extremely difficult to selectively in-gate operands to a register e.g., 14, 15, 16, 17, 18, 19 for the next cycles execution, based on the current cycles execution results. Therefore, it will be readily appreciated that it is more desirable to use the current cycles execution results to affect the selection of operands in the following cycle.

In an exemplary embodiment, if the processor 1 dispatches a decimal divide instruction across several execution units the two binary adders 24F, 24 H in the X and Y-pipes 10A, 10B may be used to make initial tests on the dividend (or partial remainder) and any previously setup multiple of the divisor. The Z-pipe 10C can be used to perform a true subtraction of the dividend (or partial remainder) from any previously setup multiple of the divisor resulting in a true partial remainder. The Z-pipe 10C is the execution path where iterative subtractions are performed.

At the beginning of the methodology 100 involving a loop for determining a quotient digit QD, the registers A1 14, A2 16, and A3 18 of the three execution paths e.g., the X pipe 10A, Y pipe 10B, and Z pipe 10C are fed to contain the dividend (or partial remainder) and registers B1 15, B2 17, and B3 19 are fed to contain three different multiples of the divisor. The three multiples of the divisor are created using the decimal adder Dec 24I during an initial setup routine before the quotient digit QD determining loops are executed. The multiples needed are dependent upon the search path which is to be taken through the possible quotient digits QDs. It will be appreciated that in an exemplary embodiment the search path is carefully selected balancing the number of cycles it takes to create the multiples with the effectiveness of the three initial subtractions. For example, if three parallel subtractions are to be made the ten possible quotient digits QDs may be divided into four possible quotient digit QD groups. The three subtractions determine which group includes the correct quotient digit QD. There are several approaches that can be taken to divide the digits into four groups. One approach is to somewhat evenly divided the QDs such that the groups contain no more than three digits.

Table 1 indicates four setup steps utilized in an exemplary embodiment to create three divisor multiples using the decimal adder Dec 24I when the possible QDs are divided into four small groups with a maximum of three digits. For example the first group requires subtractions to be made with 2, 4, and 7 times (also denoted herein as 2×, 4×, and 7×) the divisor to divide the possible quotient digits into the shown groups. It should be appreciated that to create these multiples, first the divisor is added to itself to create a 2× multiple of the divisor, then the 2× multiple of the divisor is added to 2× the divisor (e.g., itself) to create a 4× multiple of the divisor, once again, a 2× multiple of the divisor is added to the 4× multiple of the divisor to create a 6× multiple of the divisor, finally, the 6× multiple of the divisor must be added to the divisor to create a 7× multiple of the divisor. It should readily be appreciated that other addition sequences of multiples of the divisor may readily be employed. Obviously, it is advantageous to utilize a sequence that utilizes the least number of cycles, to reduce the set up time for the division methodology 100.

TABLE 1

QDs divided into 4 small groups (max. 3 digits/group).

| SMALLEST QD GROUPS: | REQUIRED TESTS: | DIVISOR MULTIPLE CREATION STEPS: |
|---|---|---|
| [0, 1], [2, 3], [4, 5, 6], [7, 8, 9] | 2X, 4X, 7X | 2X, 4X, 6X, 7X |
| [0, 1], [2, 3, 4], [5, 6], [7, 8, 9] | 2X, 5X, 7X | 2X, 4X, 5X, 7X |
| [0, 1, 2], [3, 4], [5, 6], [7, 8, 9] | 3X, 5X, 7X | 2X, 3X, 5X, 7X |
| [0, 1, 2], [3, 4], [5, 6, 7], [8, 9] | 2X, 5X, 8X | 2X, 3X, 5X, 8X |
| [0, 1, 2], [3, 4], [5, 6, 7], [8, 9] | 3X, 5X, 8X | 2X, 3X, 5X, 8X |
| [0, 1, 2], [3, 4, 5], [6, 7], [8, 9] | 3X, 6X, 8X | 2X, 3X, 6X, 8X |

Table 2 provides a listing of other groupings of the QD. Table 2 indicates there is only one grouping that results in fewer setup cycles when the possible QDs are divided into three small groups of 4 digits maximum. These groups represent the case when only two subtractions can be made at the beginning of a QD determining loop.

TABLE 2

QDs divided into 3 small groups (max. 4 digits/group)

| SMALLEST QD GROUPS: | REQUIRED TESTS: | DIVISOR MULTIPLE CREATION STEPS: |
|---|---|---|
| [0, 1, 2, 3], [4, 5, 6], [7, 8, 9] | 4X, 7X | 2X, 4X, 6X, 7X |
| [0, 1, 2], [3, 4, 5, 6], [7, 8, 9] | 3X, 7X | 2X, 3X, 6X, 7X |
| [0, 1, 2], [3, 4, 5], [6, 7, 8, 9] | 3X, 6X | 2X, 3X, 6X |

Table 3 indicates two interesting group divisions with a maximum of 4 digits within the group. Once again, it should appreciated that other groups are possible. The first grouping of Table 3 requires only two multiples of the divisor be created, specifically, a 3× multiple and a 6× multiple (1× is given). It requires 3 steps during setup to formulate the 3× and 6× multiples. The last grouping in Table 3 requires 3 steps also but in that case 4 multiples must be kept available for the quotient digit determining loops. This is because 1× (the divisor) must be kept for iterative subtractions.

TABLE 3

QDs divided into 4 small groups (max. 4 digits/group)

| SMALLEST QD GROUPS: | REQUIRED TESTS: | DIVISOR MULTIPLE CREATION STEPS: |
|---|---|---|
| [0], [1, 2], [3, 4, 5], [6, 7, 8, 9] | 1X, 3X, 6X | 2X, 3X, 6X |
| [0, 1], [2, 3], [4, 5, 6, 7], [8, 9] | 2X, 4X, 8X | 2X, 4X, 8X |

Turning now to the next process of the division methodology 100, the search for the correct quotient digits QD. It should be appreciated, that the optimum search is dependent on the number and type of adders e.g., binary adders, Bin 1 24F and Bin2 24H, as well as decimal adder, Dec 24I, available in the configuration of the processor 1. In a first exemplary embodiment with processor configuration including one decimal adder 24I (and no binary adders) 1× the divisor is iteratively subtracted resulting in a search path for the correct quotient digit as follows:

0X
      1X
         2X (1X the divisor subtracted twice)
            3X (1X the divisor subtracted three times . . . etc . . . )
               4X
                  5X
                     6X
                        7X
                           8X
(this takes 9 steps/cycles of subtractions)   9X The correct quotient digit, QD is determined when a subtractions result in a transition from a positive to a negative partial remainder. In this case the last partial remainder must be restored (dividend added back). It is also possible to start subtracting with a higher multiple of the divisor and then add back 1× the divisor until the addition result transitions from a negative to a positive partial remainder. In this case there is an advantage in that the last partial remainder does not need to be restored. With this in mind subtractions and subsequent subtractions or additions could start at any multiple of the divisor. An example is shown:

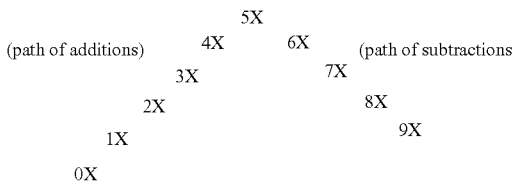

It should be noted that 0× the divisor does not need to be actually computed if the original dividend or partial remainder is saved and can be retrieved knowing that the last addition at 1× the divisor did not result in a positive result. It takes 5 steps or cycles to produce all possible partial remainders.

In another exemplary embodiment two (or more) decimal adders Dec 24I and Dec2 24J are available (no binary adders) two searches could be started. The optimum starting points in this case are to start subtracting with 2× and 7× the divisor in each adder. The search path in one-instance could be as follows:

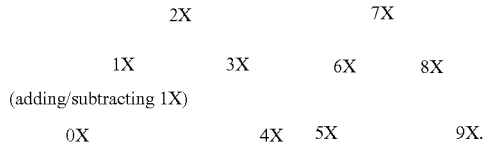

In another exemplary embodiment, if one decimal adder Dec 24I and one binary adder e.g., either Bin1 24F or Bin2 24H are available a search path can be started in the decimal adder 24I and a test made in the binary adder Bin1 24F or Bin2 24H may be used to redirect the search path in the decimal adder Dec 24I. If the binary adder Bin1 24F or Bin2 24H test is performed in parallel to the first decimal subtraction at the beginning of a quotient digit determining loop the search path may readily be changed for the third step or cycle within the decimal adder Dec 24I. In this instance, 4 steps or cycles produce all possible partial remainders. An example is shown below:

The test may be initiated by subtracting a 3× multiple of the divisor in the decimal adder Dec 24I and a parallel test for 6× the divisor in the binary adder Bin1 24F or Bin2 24H

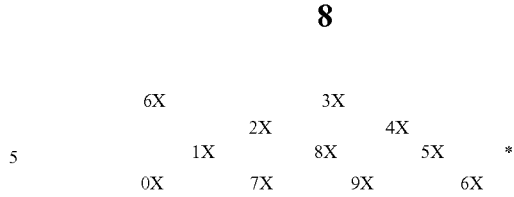

*The search path can be changed in the third cycle by either bringing back the original dividend/partial remainder and subtracting an 8X multiple of the divisor or by using the previous partial remainders result which will be less 4X the divisor and subtracting 4X the divisor (8X the divisor total subtraction). The selection of operands for the third cycles execution is done during the second cycle based on the first cycles execution result. It should also be noted that it would require 4 extra tests (excluding the initial tests for the 3X and 6X multiples of the divisor) to take only 3 cycles to produce any of the possible partial remainders. This means half the divisor multiples would be tested in the first cycle to affect the third cycles execution.

For example:

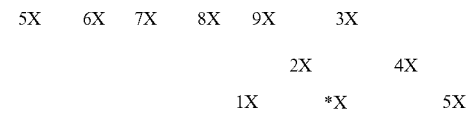

*X based on initials tests

In an exemplary embodiment it will be appreciated that by balancing the five premises and available dataflow elements (available hardware architecture), an optimal routine can be found to search the ten possible quotient digits QDS. Described herein in an exemplary embodiment is one such balance that takes advantage of a search path using one decimal adder Dec 24I and two binary adders Bin1 24F or Bin2 24H as depicted in FIG. 1. In parallel the decimal adder Dec 24I can start a search path by subtracting 6× the divisor while the binary adders Bin1 24F and Bin2 24H perform subtraction tests for the IX and 3× multiples of the divisor, respectively (or vice versa). The decimal adder Dec 24I continues in the following step/cycle to either add or subtract a 1× multiple of the divisor to the partial remainder formed from the first subtraction of 6× resulting in a total subtraction of either a 5× or 7× multiple of the divisor. In the third step/cycle either the decimal additions or subtractions continue with 1× the divisor or 1× the divisor is subtracted from the initial dividend/partial remainder from the beginning of the quotient digit determining loop. Advantageously, this change in search path is determined solely based on the early 3× multiple subtraction test. The 1× subtraction test comes for "free" from a cycle stand point since an extra binary adder and 1× multiple of the divisor are available. The 1× test indicates, when the result is negative (sign change), to end the loop early since the correct partial remainder for the loop is the beginning dividend/partial remainder. The resulting search path may be depicted as follows.

For the following tests with multiples of the divisor:

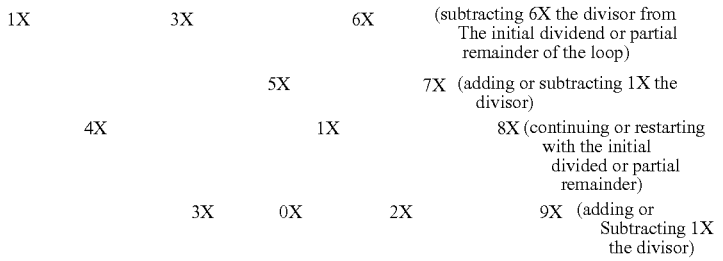

The combined results of the initial three subtraction tests and the appropriate actions are listed in Table 4 as follows. A carry out indicates the divisor was less than or equal to the initial dividend or partial remainder.

TABLE 4

Adder results for initial subtractions and the associated QD group.

| Binary Adder 24F Div-1X | Binary Adder 24H Div-3X | Decimal Adder 24I Div-6X | QD Group |
|---|---|---|---|
| Carry out = 0 | Carry out = 0 | Carry out = 0 | [0] |
| Carry out = 1 | Carry out = 0 | Carry out = 0 | [1, 2] |
| Carry out = 1 | Carry out = 1 | Carry out = 0 | [3, 4, 5] |
| Carry out = 1 | Carry out = 1 | Carry out = 1 | [6, 7, 8, 9] |

It may be noted that using the above search approach it takes four cycles to create the ten possible partial remainders. Only two tests (3× and 6× of the divisor) are needed to follow this search path. The 3× and 6× multiples of the divisor are created in 3 steps/cycles during the initial setup routine. After the first step the multiples do not need to be readily available since 1× the divisor is used for all of the following additions or subtractions (i.e., in the third step/cycle the minuend must be changed but the subtrahend remains to be 1× the divisor). Since two binary adders Bin1 24F and Bin2 24H are available a third test for 1× is made to determine early if the quotient digit is zero.

Detailed implementation using a Divide Decimal (DP) Instruction

Referring once again to FIG. 1 and to FIG. 2 as well, a decimal division instruction for the processor 1 executes a methodology 100 of an exemplary embodiment. The methodology for the division is a multi-cycle operation that computes the quotient and remainder of the first operand (the dividend) and the second operand (the divisor) and places it in the first operand location. In an exemplary embodiment, the operands are checked for validity, e.g., invalid decimal data (binary coded decimal), the divisor length is selected to be less than the dividend length, the divisor must not be zero, and the quotient must not be too large to be represented by the number of digits specified (dividend must be checked to assure that it contains enough leading zeros such that the quotient and remainder can occupy the first operand location, therefore a division overflow can not occur). Therefore, in an exemplary embodiment, the dividend with sign may be up to two double words (128-bits) in length and the divisor with sign may be up to one double word (64-bits) in length.

Initial Setup

In an exemplary embodiment, initial operand data is in-gated into multiple registers e.g., the A and B registers 14, 15, 16, 17, 18, 19 of the X, Y, and Z pipes 10A, 10B, and 10C as depicted at process block 102. The data is formatted during a setup and initialization sequence as depicted at process block 104. The significant digits of the divisor are left aligned with a single leading zero. This is done to ensure significant digits of multiples of the divisor are not lost. In addition, as mentioned earlier, during setup validity tests may be performed. For example, during the setup routine decimal data and decimal divide exceptions are also checked. At process block 106 the desired multiples of the divisor are generated. In an exemplary embodiment, the decimal adder Dec 24I is used to create the multiples of the divisor e.g., two times (2×) the divisor, then three times (3) the divisor, and then six times (6×) the divisor as described above. At process block 108 the desired multiples are formatted and saved to be used each quotient digit determining loop.

At the beginning of the quotient digit determining loop of the methodology 100 the A1 14, A2 16, & A3 18 registers contain the most significant digits of the dividend left aligned with the least significant digits spanning into the E register 20. The divisor can be 15 decimal digits and the dividend 31 decimal digits spanning two registers. All operations are performed on 64 bits representing 16 decimal digits. In an exemplary embodiment, the B1 register 15 is loaded with the significant digits of the one times (133 ) multiple of the divisor left aligned (includes a leading zero). The B2 register 17 is fed the significant digits of the three times (3×) multiple of the divisor left aligned (may include a leading zero). Finally, the B3 register 19 is loaded with the significant digits of the six times (6×) multiple of the divisor left aligned (may include a leading zero).

As depicted at process block 110, the QD determining loop of the methodology 100 starts with a normal iterative approach in a decimal adder Dec 24I while doing two side quotient digit group tests in two available binary adders Bin1 24F and Bin2 24H. The first step utilizes, in parallel, two binary adders Bin1 24F and Bin2 24H to subtract two different multiples (e.g., the 1× and 3× multiples) of the divisor from the dividend while decimal adder Dec 24I is used to do a true subtraction of a third multiple of the divisor (e.g., the 6× multiple) from the dividend. These first three subtractions are used to divide the ten possible quotient digits into four possible quotient digit groups: [0], [1, 2], [3, 4, 5], [6, 7, 8, 9] as described earlier.

One binary adder Bin1 24F subtracts the divisor (i.e., 1 times the divisor) from the dividend. This subtraction determines if the quotient digit is 0 or if the quotient digit is at least 1. (i.e., determines if the quotient digit is [0] or in the group [1, 2, 3, 4, 5, 6, 7, 8, 9]). The other binary adder Bin2 24H subtracts a multiple of three times the divisor (3×) (generated during setup and saved) from the dividend. This subtraction determines if the quotient digit is less than 3 (if there is no carry out) or if the quotient digit is at least 3 (if there is a carry out). (i.e., determines if the quotient digit is in the group [0, 1, 2], or group [3, 4, 5, 6, 7, 8, 9]). Last, the decimal adder Dec 24I subtracts a multiple of six times the divisor (6×) (also generated earlier and saved) from the dividend. This subtraction determines if the quotient digit is less than 6 or if the quotient digit is at least 6. (i.e. determines if the quotient digit is in the group [0, 1, 2, 3, 4, 5], or group [6, 7, 8, 9]). It will be appreciated that while the binary adders Bin1 24F and Bin2 24H cannot perform a mathematically accurate subtraction, the binary adders Bin1 24F and Bin2 24H as employed herein in an exemplary embodiment provide a comparison function that facilitates the determination of the quotient digit.

The first subtraction in the decimal adder 24I also computes the first partial remainder. It may then be readily observed that the combined results of the three subtractions (e.g., whether or not there is a carry out from each subtraction) determines which of the four possible quotient digit groups contains the actual quotient digit. Table 5 depicts the results of the combined subtractions.

TABLE 5

Adder results for initial subtractions and the associated QD group.

| Binary Adder 24F | Binary Adder 24H | Decimal Adder 24I | QD Group |
|---|---|---|---|
| Carry out = 0 | Carry out = 0 | Carry out = 0 | [0] |
| Carry out = 1 | Carry out = 0 | Carry out = 0 | [1, 2] |
| Carry out = 1 | Carry out = 1 | Carry out = 0 | [3, 4, 5] |
| Carry out = 1 | Carry out = 1 | Carry out = 1 | [6, 7, 8, 9] |

It will also be appreciated that utilization of 3× and 6× multiples of the divisor was determined by balancing performance factors as described above. Some performance factors include, but are not limited to, the number of cycles needed to setup operands for the iterative quotient determination loop by preparing multiples of the divisor, a minimum cycle quotient digit determining loop, utilization of currently available common dataflow elements, access of a register 11 file, and control determination from dataflow results.

Continuing with FIG. 2, at process block 112 previous results are formatted and saved to be restored when subtracting results in a negative partial remainder. While in parallel, the second step of the QD determining loop of the methodology 100 performs either an addition as depicted at process block 122 or a subtraction as depicted at process block 116 in the decimal adder Dec 24I based simply on the carry out of the result from the first step, as depicted at process block 114 e.g., the comparison of the dividend and the 6× multiple of the divisor. In other words, the decimal adder Dec 24I is used to continue subtracting the divisor (1×) from or to add the divisor to the partial remainder from step one in process block 110. This step results in a partial remainder of the dividend minus 5× or dividend minus 7×, respectively. The remaining steps use the decimal adder Dec 24I in this same way (subtracting the divisor) until the partial remainder is negative and must be restored as depicted by process blocks 116 and 120 and decision block 118 or (adding the divisor) until the partial remainder is non-negative and smaller than the divisor as depicted by process blocks 122 and 124 and decision block 126.

Figure 3:
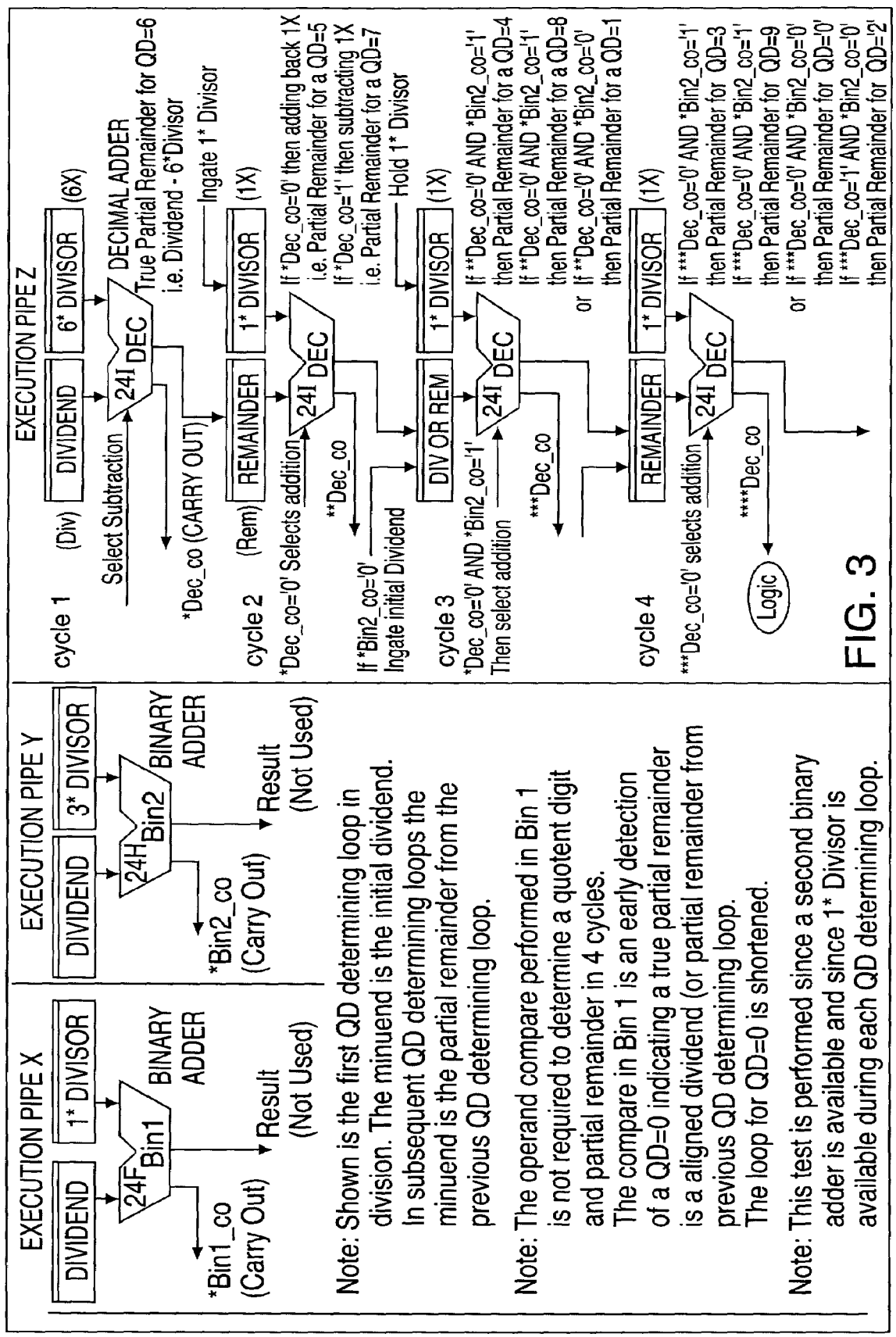
FIG. 3 depicts a quotient digit determination tree in accordance with an exemplary embodiment.

Once again, the results from above processing are formatted and saved as depicted at process block 112. The methodology 100 then continues to process block 128 if the quotient digit is determined to be less than 3 in value as depicted at decision block 126 from the subtraction test performed in the first step in the binary adder Bin2 24H as depicted at process block 110. Processing then continues with either an addition or subtraction in the decimal adder Dec 24I based on the previous steps operation as depicted at decision block 114 and process blocks 116 and 122. In an exemplary embodiment, if the quotient digit is determined to be less than 3 then a straight subtraction of the divisor (1×) from the dividend or partial remainder of the previous quotient digit determining loop is performed. The divisor (1×) continues to be subtracted from or added to this partial remainder in step 4 as depicted at decision block 114 and process blocks 116 and 122 until the correct quotient digit is determined and partial remainder is obtained as depicted at decision blocks 118 and 124. In this way the correct quotient digit and partial remainder is found. FIG. 3 depicts a quotient digit determination tree including depiction of the processing of the quotient digit determination loop of methodology 100.

The partial remainder for any of the ten possible quotient digits are generated within four cycles as depicted in Table 6. An extra cycle may or may not be needed to determine the correct quotient digit. The correct quotient digit is determined by the results of two consecutive quotient digit tests, subtractions, and/or additions. Once the correct quotient digit is determined the result of either the previous cycle or the current cycle is the partial remainder that is fed to the next quotient determining loop. If the current subtraction results are positive and the previous cycles subtraction resulted in a negative result, such as the left part of the tree in FIG. 3 where 1× is added back, then the current partial remainder is used and correct quotient digit is known as the current QD being tested. However, if the current subtraction results are negative and the previous cycles subtraction resulted in a positive result, then the previous cycles result is the correct partial remainder and the correct quotient digit is the previous cycles multiple of the divisor. In this case an extra cycle was required to determine if the previous result was the partial remainder and the correct quotient digit.

TABLE 6

Partial remainder result for initial subtractions and the associated QD group.

| Dividend - 1X | Dividend - 3X | Dividend - 6X | QD Group |
|---|---|---|---|
| Negative | Negative | Negative | [0] |
| Positive | Negative | Negative | [1, 2] |
| Positive | Positive | Negative | [3, 4, 5] |
| Positive | Positive | Positive | [6, 7, 8, 9] |

Table 7 indicates the number of cycles required to determine each quotient digit and the subtraction results required. An extra cycle is added to select the partial remainder and setup for the next quotient digit determining loop. Therefore, it takes an average of 4.2 cycles to determine a quotient digit.

It is possible to derive a more aggressive quotient digit determining loop where the subtrahend in the third step (cycle) could be selected from a few different multiples of the divisor. In a couple cases the quotient digit could be determined a cycle earlier. The loop chosen is a simplification (the same multiple 1× the divisor is always used). Otherwise, the divisor would need to be kept in a scratch register and accessed appropriately at the beginning of each quotient digit determining loop. This would lead to further control complexity with a small benefit.

TABLE 7

Cycles to determine a QD due to subtraction results.

| Q D = | Known at end of cycle | Subtraction result |
|---|---|---|
| 6 | 2 | Div-6X is positive, Div-7X is negative |
| 5 | 2 | Div-5X is positive, Div-6X is negative |
| 7 | 3 | Div-7X is positive, Div-8X is negative |
| 4 | 3 | Div-4X is positive, Div-5X is negative |
| 8 | 4 | Div-8X is positive, Div-9X is negative |
| 9 | 4 | Div-9X is positive |
| 3 | 4 | Div-3X is positive, Div-4X is negative |
| 0 | 1 | Div-1X is negative |
| 1 | 4 | Div-1X is positive, Div-2X is negative |
| 2 | 4 | Div-2X is positive, Div-3X is negative |

The disclosed invention can be embodied in the form of computer, controller, or processor 1 implemented processes and apparatuses for practicing those processes, The present invention can also be embodied in the form of computer program code containing instructions embodied in tangible media 2, such as floppy diskettes, CD-ROMs, hard drives, or any other computer-readable storage medium, wherein, when the computer program code is loaded into and executed by a computer, controller, or processor 1, the computer, controller, or processor 1 becomes an apparatus for practicing the invention. The present invention may also be embodied in the form of computer program code as a data signal 3, for example, whether stored in a storage medium, loaded into and/or executed by a computer, controller, or processor 1, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, 1 the computer program code segments configure the processor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for decimal division in a superscalar processor comprising:
   a first pipeline including: a first register; a second register; a third register; an execution unit including a bit logic unit and a binary adder in operable communication with said first register, said second register, and said third register; and a first rotator in operable communication with said first register and said execution unit;
   a second pipeline comprising: a fourth register; a fifth register; a sixth register; a second execution unit including another bit logic unit and another binary adder in operable communication with said fourth register, said fifth register, and said sixth register; and a rotator in operable communication with said fourth register and said execution unit;
   a third pipeline comprising: a seventh register; a eighth register; a ninth register; a decimal adder in operable communication with said seventh register and said eighth register, a rotator in operable communication with said ninth register;
   a general register for storage and retrieval of data;
   an operand buffer for obtaining a first operand and a second operand; and
   a communication bus for communication among at least two of said first pipeline, said second pipeline, said third pipeline, said general register and said operand buffer.

2. The system of claim 1 wherein a divisor and a dividend are established from said first operand and said second operand; and at least one of a quotient digit and a partial remainder term is generated;
   wherein said partial remainder term is created by subtracting selected multiples of said divisor from said dividend, said multiples being one times the divisor, three times the divisor, and six times the divisor and said quotient digits are determined by subtracting any multiple of an aligned divisor from at least one of said dividend and a partial remainder.

3. The system of claim 1 wherein a carry out bit from a binary adder is utilized to determine at least one of:
   if one decimal number is either less than another decimal number; and
   if one decimal number is greater than or equal to another decimal number.

4. The system of claim 1 further including at least one of said first pipeline, said second pipeline and said third pipeline performing multiple parallel subtractions, using different multiples of an aligned divisor from said dividend or partial remainder.

5. The system of claim 4 wherein said multiple parallel subtractions are used to determine whether a quotient digit resides within a selected range of quotient digits.

6. The system of claim 1 wherein an adder in at least one of said first pipeline, said second pipeline and said third pipeline subtracts any multiple of an aligned divisor from at least one of said dividend and a partial remainder.

7. The system of claim 1 wherein a quotient digit is determined from any divisor multiple to greater or lesser multiples by at least one of, adding an aligned divisor from a previous subtraction result and subtracting an aligned divisor from a previous subtraction result.

8. The system of claim 1 wherein a carry out bit resultant from said decimal adder is utilized to select one of addition and subtraction in said decimal adder for a next sequential cycle.

9. The system of claim 1 wherein a carry out bit resultant from said decimal adder is utilized to selectively in-gate operands to a register.

10. The system of claim 1 wherein a space of possible quotient digits based on a given number of available adders is searched and divided with consideration to a number of cycles a search requires starting from different multiples of said divisor and a number of cycles that are required to setup multiples of said divisor to be used in said searching.

11. The system of claim 1 wherein said first rotator is a bit shifter that facilitates at least one of wrap around and bit filling.

* * * * *